United States Patent
Yuan et al.

(10) Patent No.: US 8,619,512 B1
(45) Date of Patent: Dec. 31, 2013

(54) STRESS BUFFER FOR NEAR-FIELD TRANSDUCER IN ENERGY ASSISTED MAGNETIC RECORDING AND METHODS FOR FABRICATING THE SAME

(75) Inventors: Hongxing Yuan, San Ramon, CA (US);
Zhongyan Wang, San Ramon, CA (US);
Wentao Yan, Fremont, CA (US);
Matthew R. Gibbons, San Jose, CA (US); Michael V. Morelli, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/531,380

(22) Filed: Jun. 22, 2012

(51) Int. Cl.
*G11B 11/00* (2006.01)

(52) U.S. Cl.
USPC ...................................... 369/13.33

(58) Field of Classification Search
USPC ........ 369/13.02, 13.13, 13.32, 13.33, 112.09,
369/112.14, 112.21; 360/59; 385/31,
385/88–94, 129; 29/603.07–603.27;
250/201.3, 201.5
See application file for complete search history.

(56) References Cited

U.S. PATENT DOCUMENTS

| | | | |
|---|---|---|---|
| 4,667,395 A | 5/1987 | Ahlgren et al. | |
| 5,994,747 A | 11/1999 | Wu | |
| 6,746,877 B1 | 6/2004 | Hornik et al. | |
| 6,795,630 B2 | 9/2004 | Challener et al. | |
| 7,272,079 B2 | 9/2007 | Challener | |
| 7,500,255 B2 | 3/2009 | Seigler et al. | |
| 7,885,029 B2 | 2/2011 | Miyauchi et al. | |
| 7,996,986 B2 | 8/2011 | Gokemeijer | |
| 8,164,855 B1 | 4/2012 | Gibbons et al. | |
| 8,248,891 B2 | 8/2012 | Lee et al. | |
| 8,320,220 B1 | 11/2012 | Yuan et al. | |
| 2003/0137772 A1 | 7/2003 | Challener | |
| 2007/0139818 A1 | 6/2007 | Shimazawa et al. | |
| 2008/0068748 A1 | 3/2008 | Olson et al. | |
| 2009/0073858 A1 | 3/2009 | Seigler et al. | |
| 2010/0061199 A1 | 3/2010 | Hirara et al. | |
| 2010/0104768 A1 | 4/2010 | Xiao et al. | |
| 2010/0123965 A1 | 5/2010 | Lee et al. | |
| 2010/0123967 A1 | 5/2010 | Batra et al. | |
| 2010/0157745 A1 | 6/2010 | Okada et al. | |
| 2010/0214685 A1 | 8/2010 | Seigler et al. | |
| 2010/0284252 A1* | 11/2010 | Hirata et al. | 369/13.33 |
| 2012/0230169 A1* | 9/2012 | Shimazawa et al. | 369/13.33 |

* cited by examiner

*Primary Examiner* — Brenda Bernardi

(57) ABSTRACT

An energy assisted magnetic recording (EAMR) head having a stress buffer for reducing the stress on a near-field transducer during thermal expansion and methods for fabricating the EAMR head are provided. The EAMR head includes a waveguide, a near-field transducer (NFT) configured to receive optical energy from the waveguide, and a cladding of the waveguide has an opening. The NFT is positioned within the opening, and an air gap is formed between the NFT and a side wall of the opening.

31 Claims, 8 Drawing Sheets

STRESS BUFFER FOR NEAR-FIELD TRANSDUCER IN ENERGY ASSISTED MAGNETIC RECORDING AND METHODS FOR FABRICATING THE SAME

FIELD

Embodiments of the present invention relate generally to components of magnetic storage devices, and more specifically to a stress buffer for a near-field transducer in energy assisted magnetic recording and methods for fabricating the same.

BACKGROUND

With current perpendicular magnetic recording technology, the magnetic recording areal density of magnetic recording media (e.g., hard disc platters) has been increased significantly and approaches the physical upper limit due to the superparamagnetic effect. Although magnetic materials with higher coercivity such as FePt, CoPd, etc. have been developed, these materials generally have poor writability due to availability of writing field as a result of saturation of the writing head. Energy assisted magnetic recording (EAMR) or heat assisted magnetic recording (HAMR) technology has been developed as a solution to circumvent the writeability problem and further increase the data areal density to 1 Tbit/$in^2$ and beyond.

In an EAMR system, a near-field transducer (NFT) directs a concentrated field into an adjacent recording medium. Once the medium absorbs the energy of the field, the temperature of the medium increases at a preselected local spot for recording. A waveguide couples light of a preselected wavelength from a light source and focuses the light near the NFT such that the NFT can strongly couple the light energy from the waveguide and form a local surface plasmon. The NFT is a strong absorber of light at resonant status assisted by the surface plasmon effect, and is capable of concentrating the light energy to a very small area (e.g., 40 nm). Therefore, the NFT functions as a relay to deliver the concentrated energy to a recording layer of the medium which can be located several nanometers away from the NFT within the near-field zone.

When the recording medium is heated up, it becomes magnetically soft to allow a writing field to flip the bit data in this small heated area to the desired bit. Due to the resonant coupling of light energy from the waveguide to the NFT, the temperature of the NFT can become very high, even close to its melting point in the worst case. Even if the temperature of the NFT is kept below the melting point, elastic expansion or thermal expansion can cause a protrusion of the NFT (e.g., from an NFT pin or an NFT disk) to the air bearing surface (ABS), which is covered by a thin layer of diamond-like carbon (DLC). Therefore, proper handling of the thermal expansion of the NFT can increase the amount of light power that can be utilized and the lifetime of the EAMR system.

SUMMARY

According to embodiments of the present invention, the stress experienced by a near-field transducer (NFT) of an energy assisted magnetic recording head can be reduced by forming one or more stress buffers at locations adjacent preselected portions of the NFT. The stress buffer provides an air gap between the NFT and the adjacent dielectric material so that the NFT can expand into the space of the air gap during thermal expansion.

An embodiment of the present invention provides an energy assisted magnetic recording (EAMR) head. The EAMR head includes a waveguide, a near-field transducer (NFT) configured to receive optical energy from the waveguide, a cladding of the waveguide having an opening, wherein the NFT is positioned within the opening, and an air gap is positioned between the NFT and a side wall of the opening.

An embodiment of the present invention provides a method of fabricating an energy assisted magnetic recording (EAMR) head. The method includes forming a first cladding; forming a waveguide core on the first cladding; forming a spacer on the waveguide core; forming a near field transducer (NFT) on the spacer; forming a second cladding on the waveguide core and the second cladding having an opening, wherein the NFT is positioned within the opening; and forming an air gap positioned between the NFT and a side wall of the opening.

BRIEF DESCRIPTION OF THE DRAWINGS

The above and other features and aspects of the present invention will become more apparent by describing in detail embodiments thereof with reference to the attached drawings in which.

DETAILED DESCRIPTION

In an energy assisted magnetic recording (EAMR) system, an EAMR head includes a near-field transducer (NFT) that receives light from a waveguide and focuses the light to a nano-sized highly concentrated optical spot such that sufficient energy can be delivered to an adjacent magnetic medium to achieve EAMR writing. The reliability of the NFT will directly affect the lifetime of the EAMR head (or slider). During operation, the NFT exhibits thermal expansion and may even show plastic deformation resulting from the localized heating of the NFT. As a result, the NFT may protrude out of an air bearing surface (ABS). The protrusion can spoil the head-disc interface (HDI) and scratch the medium, and eventually, the system will experience breakdown.

According to various embodiments of the present invention, one or more stress buffers are provided adjacent the NFT such that the stress caused by the thermal expansion of the NFT can be reduced or alleviated. In several embodiments, the stress buffer is an air-gap that is deliberately introduced to surround a preselected portion of the NFT to release the thermal mechanical stress of the NFT, and thus the protrusion to the ABS can be reduced or even avoided. Accordingly, the resultant NFT lifetime can be prolonged significantly.

Figure 1A:
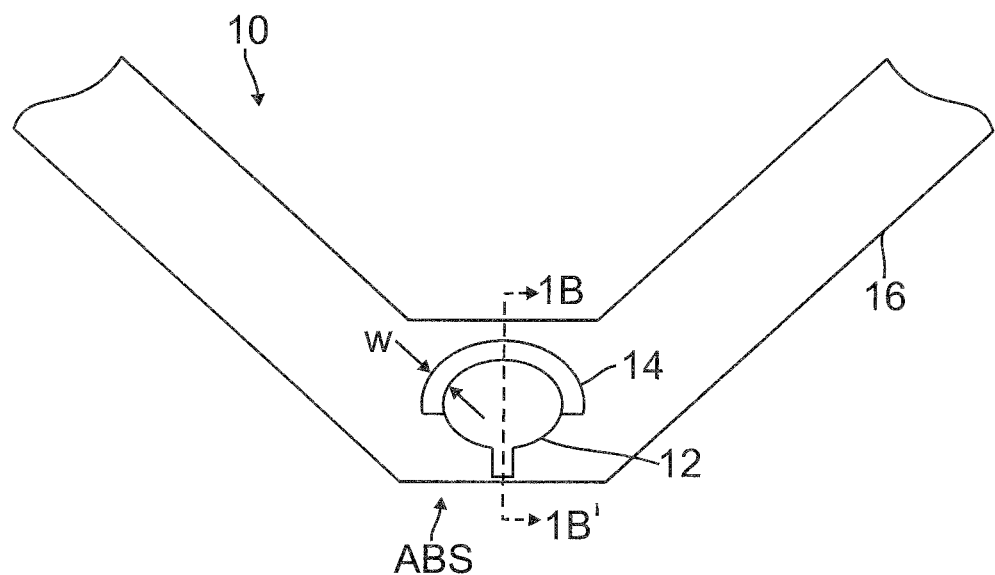
FIGS. 1A and 1B are plan view and cross-sectional view, respectively, illustrating a near-field transducer (NFT) with a stress buffer of an energy assisted magnetic recording (EAMR) head according to an embodiment of the present invention.
Figure 1B:
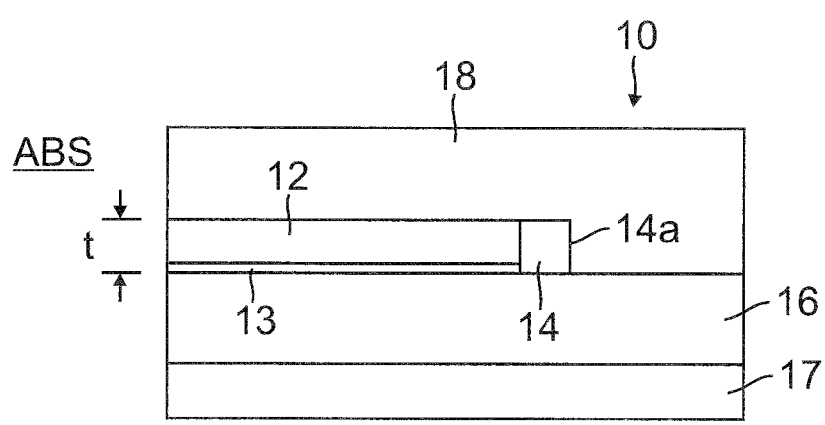

FIG. 1A is a plan view illustrating a portion of an EAMR head 10 including an NFT 12 and a stress buffer 14 according to an embodiment of the present invention. FIG. 1B is a cross-sectional view of the EAMR head 10 of FIG. 1A along the line 1B-1B'. In FIGS. 1A and 1B, only components of the EAMR head 10 that are relevant to the discussion of the present invention are illustrated. Other components of the EAMR head 10 that are generally known to a person skilled in the art are omitted for clarity. For example, the cladding material is not shown in FIG. 1A for clarity.

Referring to FIGS. 1A and 1B, a portion of a waveguide is shown including a waveguide core 16 located on a first cladding 17 (e.g., a dielectric material), and the NFT 12 is located above the waveguide core 16 that couples optical energy from a light source (e.g., laser) to the NFT 12. A spacer 13 is located between the NFT 12 and the waveguide core 16. In several embodiments, the waveguide core 16 includes a material such as $Ta_2O_5$, and the first cladding 17 includes a material such as $SiO_2$. The EAMR head 10 further includes a second cladding 18 (e.g., a dielectric layer) on the NFT 12 and the first cladding 17, and the NFT 12 is placed in an opening between the waveguide core 16 and the second cladding 18. In several embodiments, the opening (or cavity) is formed in the second cladding 18 to create a stress buffer 14 between the NFT 12 and a side wall 14a of the opening. In one embodiment, the NFT 12 is shaped to have a disc body and a pin extending from a first portion of the body as shown in FIGS. 1A and 1B. The stress buffer 14 is located at a second portion, opposite the first portion, of the body. Here, the stress buffer 14 is located at a portion of the NFT 12 facing away from the ABS. That is, a portion of the periphery of the disc body is surrounded by an air gap (i.e., stress buffer 14) so that a thermal mechanical stress of the NFT 12 during its thermal expansion can be reduced by the air gap.

In FIGS. 1A and 1B, the stress buffer 14 has a shape conforming to a portion of the periphery of the NFT 12. In one embodiment, the stress buffer 14 has the shape of an annular air gap surrounding a portion of the periphery of the NFT 12. The stress buffer 14 can be formed by various suitable methods such as angle deposition that is generally known to those skilled in the art. The stress buffer 14 has a preselected width (w) corresponding to a dimension of the NFT 12. In several embodiments, the stress buffer 14 can be set to a preselected width in consideration of the thickness (t) of the NFT 12. That is, the stress buffer 14 has a preselected width so that the width is sufficient to reduce a stress on the NFT 12 during the thermal expansion thereof by a preselected amount. The NFT 12 can be constituted of a preselected material such as Au, Au alloy, or other suitable materials.

In one embodiment, the width of the stress buffer 14 is about 10 nm, and the thickness of the NFT 12 is about 50 nm. In several embodiments, a ratio of the width of the stress buffer 14 to the thickness of the NFT 12 is about one-fifth. However, the present invention is not limited thereto. To the contrary, the NFT 12 and the stress buffer 14 can have other suitable shapes and sizes according to various embodiments of the present invention.

In FIGS. 1A and 1B, the EAMR head 10 has one stress buffer 14 that is located at a portion of the NFT 12 facing away from the ABS. However, the present invention is not limited thereto. In several embodiments, multiple stress buffers can be used to release the stress on the NFT.

Figure 2A:
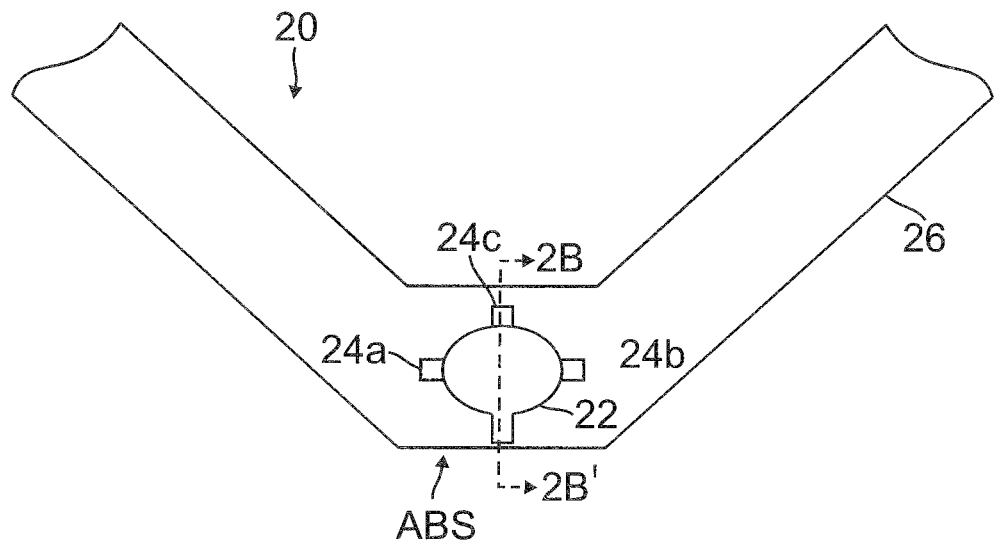
FIGS. 2A and 2B are plan view and cross-sectional view, respectively, illustrating a near-field transducer (NFT) with a stress buffer of an EAMR head according to another embodiment of the present invention.
Figure 2B:
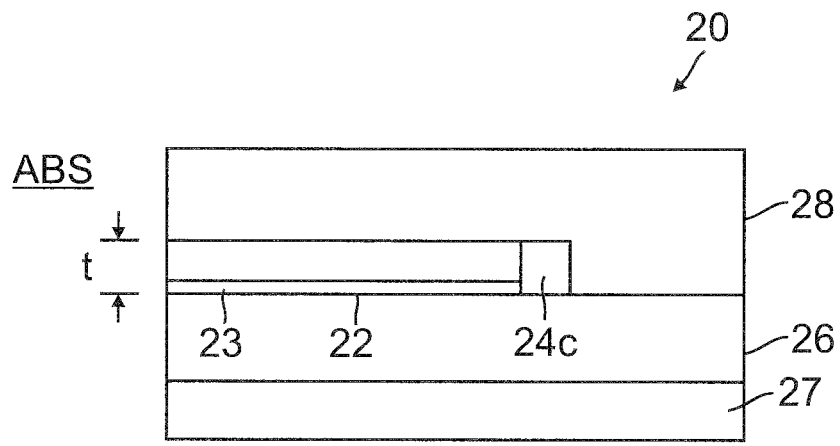

FIG. 2A is a plan view illustrating a portion of an EAMR head 20 including an NFT 22 and multiple stress buffers 24a, 24b, and 24c according to an embodiment of the present invention. FIG. 2B is a cross-sectional view illustrating the EAMR head 20 of FIG. 2A along the line 2B-2B'. Referring to FIGS. 2A and 2B, a waveguide core 26 is located on a first cladding 27 (e.g., a dielectric material), and the NFT 22 is located above the waveguide core 26 that couples optical energy from a light source (e.g., laser) to the NFT 22. A spacer 23 is located between the NFT 22 and the waveguide core 26. In several embodiments, the waveguide core 26 includes $Ta_2O_5$, and the first cladding 27 includes $SiO_2$. The EAMR head 20 further includes a second cladding 28 (e.g., a dielectric material) on the NFT 22 and the waveguide core 26, and the NFT 22 is located between the waveguide core 26 and the second cladding 28. In several embodiments, the stress buffers 24a, 24b, and 24c are formed by openings in the second cladding 28.

In FIGS. 2A and 2B, the stress buffers 24a, 24b, and 24c are located at a first portion, a second portion, and a third portion of a disc body the NFT 22, respectively. The pin of the NFT 22 extends from a fourth portion of the disc body toward the ABS. In FIGS. 2A and 2B, the stress buffer 24c is located at a portion of the NFT 22 facing away from the ABS, and the stress buffers 24a and 24b are respectively located at opposite portions of the NFT 22 along a line that is substantially parallel to the ABS and substantially bisects the disc body of the NFT 22.

However, the present invention is not limited to the above described embodiments. In several embodiments, the EAMR head 20 can have multiple stress buffers located at other preselected locations different from those shown in FIGS. 1A through 2B. In several embodiments, the stress buffers 24 can respectively border portions of the periphery of the NFT 22 where the NFT 22 will exhibit relatively greater thermal expansion (i.e., high stress) than that of other portions. High stress regions or portions of the NFT may be identified using suitable thermal modeling techniques that are generally known to those skilled in the art. Thermal expansion or thermal deformation of the NFT will generally start from the high stress regions or portions of the NFT. Therefore, the stress buffers (e.g., air gaps) located adjacent the high stress regions of the NFT will provide the room to either elastic or plastic expansion. The suitable width of the stress buffer is determined mainly by two factors. First, the air gap should provide sufficient room for reversible or irreversible deformation. Second, the aspect ratio of the air gap should be kept small enough to allow the air gap to be formed by a suitable method such as angled deposition.

Figure 3A:
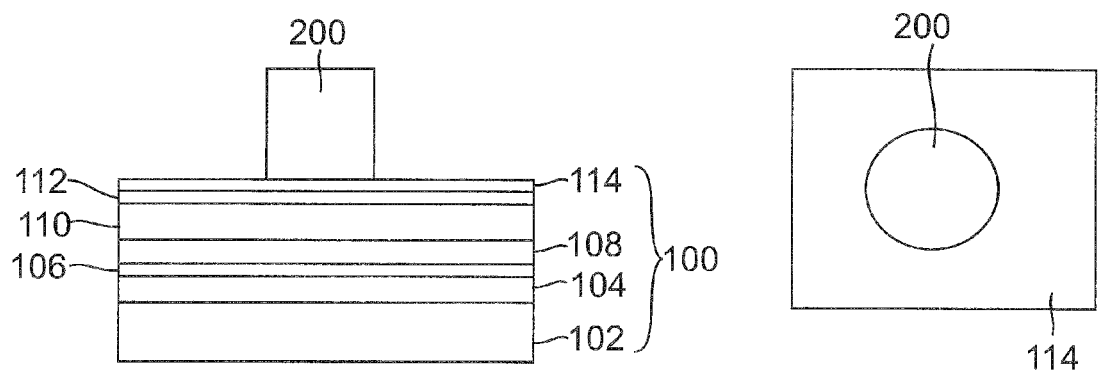
FIGS. 3A through 3O are drawings for illustrating a process of fabricating an NFT with a stress buffer according to an embodiment of the present invention.
Figure 3B:
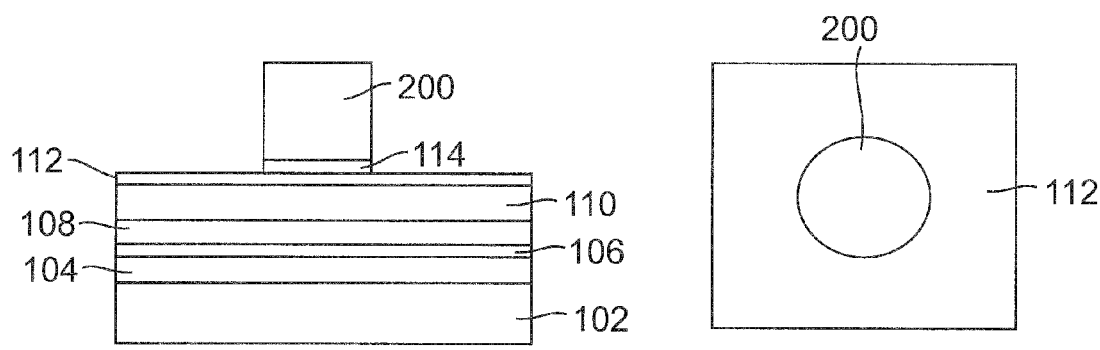
Figure 3C:
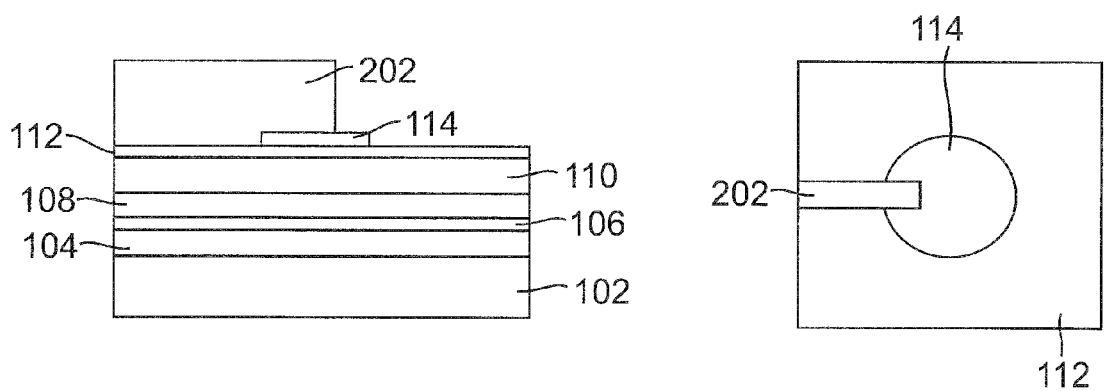
Figure 3D:
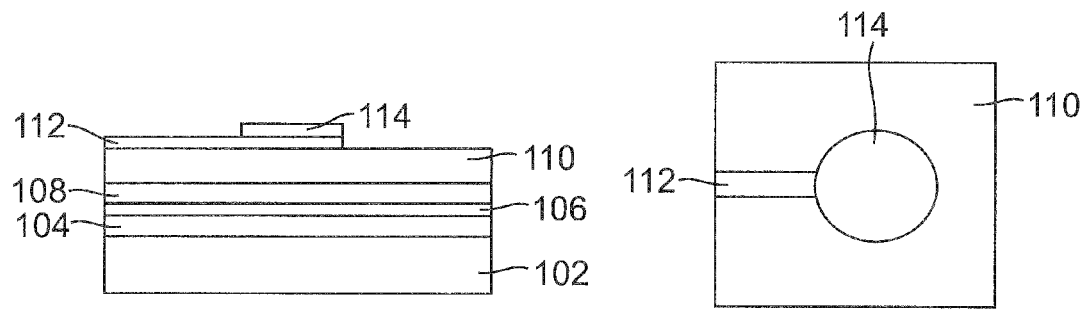
Figure 3E:
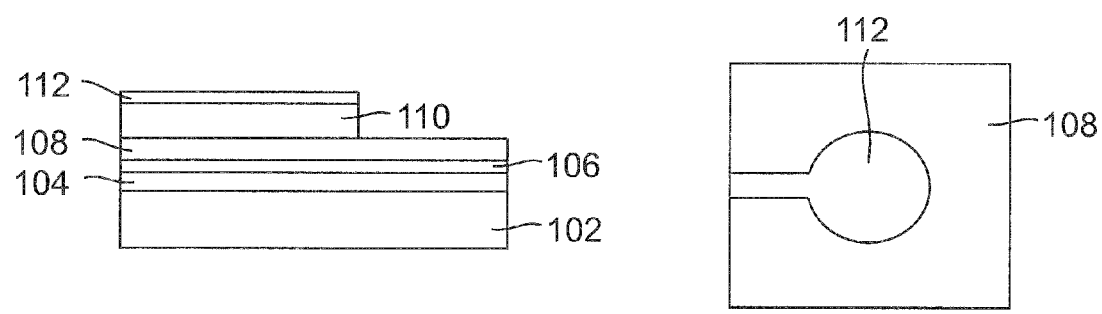
Figure 3F:
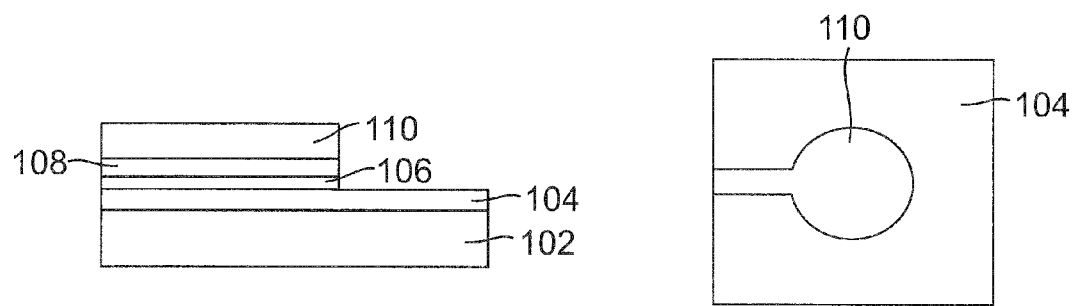
Figure 3G:
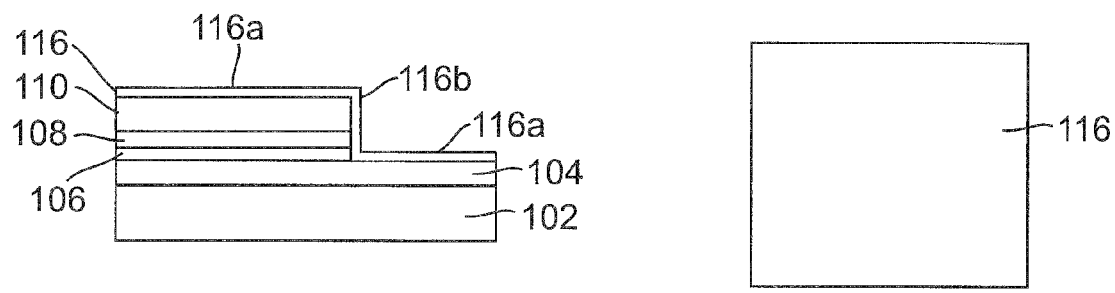
Figure 3H:
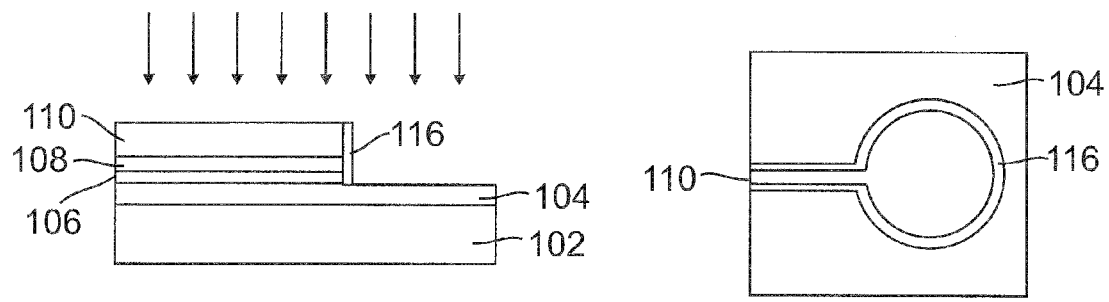
Figure 3I:
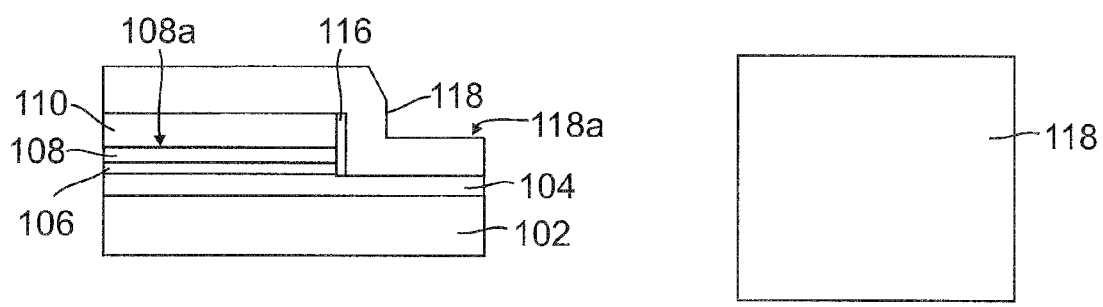
Figure 3J:
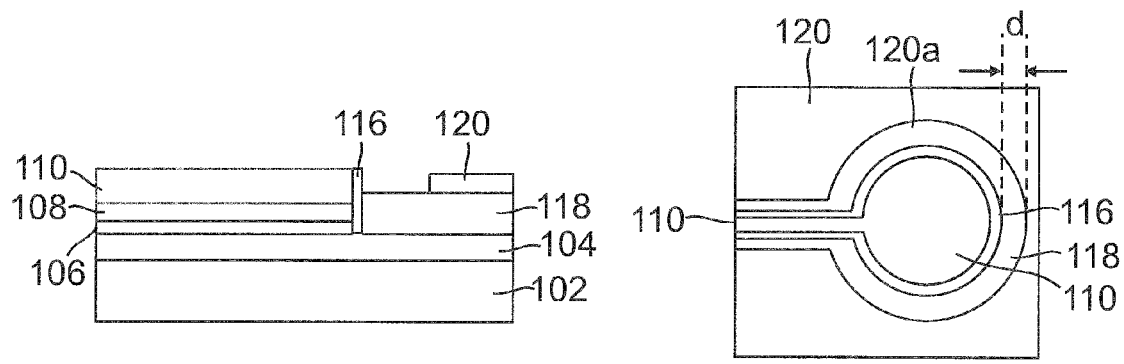
Figure 3K:
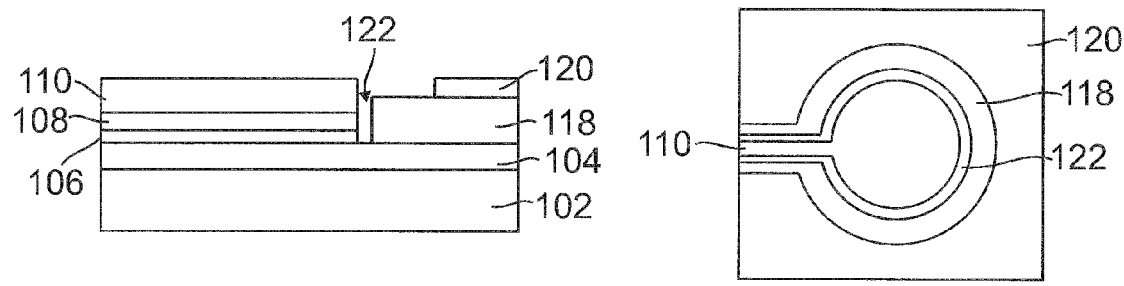
Figure 3L:
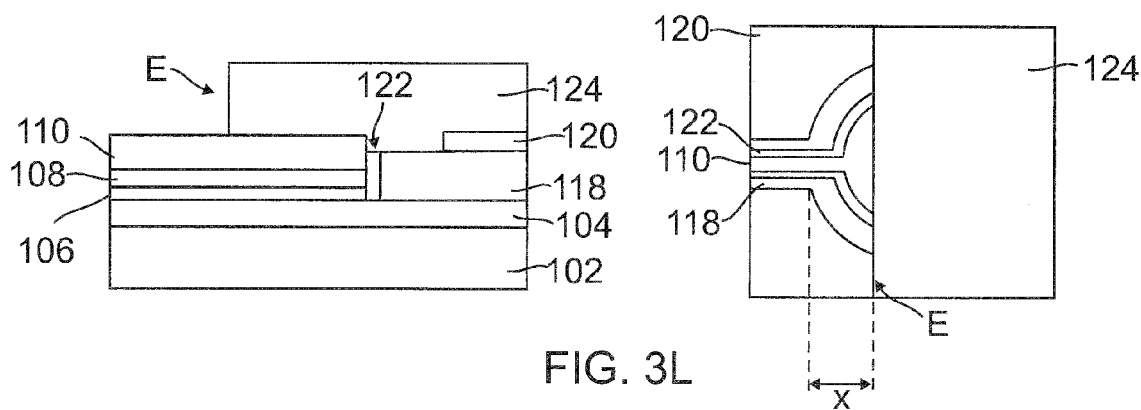
Figure 3M:
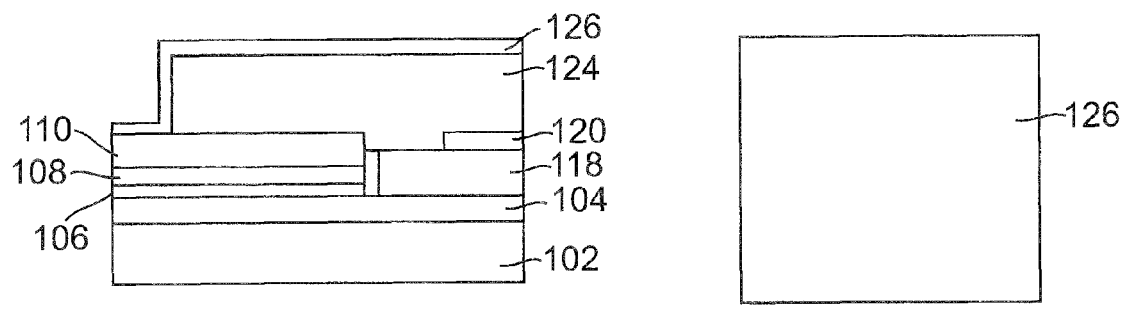
Figure 3N:
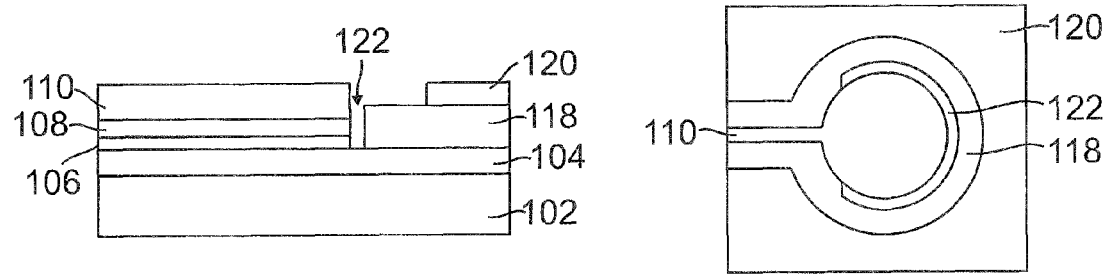
Figure 3O:
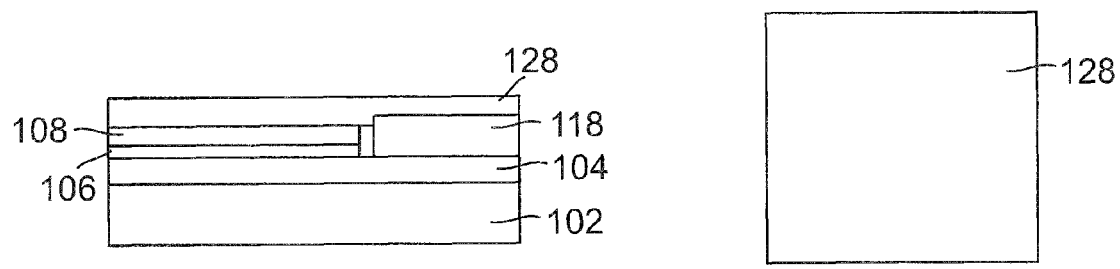

FIGS. 3A through 3O are drawings for illustrating a process of fabricating an NFT with a stress buffer according to an embodiment of the present invention. Referring to FIG. 3A, a wafer 100 including a number of preselected layers for forming the NFT is prepared. Each of FIGS. 3A through 3O shows a cross-sectional view and a top view of the wafer 100 during the process. In one embodiment, the wafer 100 includes a core layer 102 (e.g., a $Ta_2O_5$ layer), a first cladding layer 104 (e.g., a dielectric material such as a $SiO_2$ layer) on the core layer 102, a spacer layer 106 (e.g., a $Ta_2O_5$ layer) on the first cladding layer 104, an NFT layer 108 (e.g., an Au layer) on the spacer layer 106, a hard mask layer 110 (e.g., an amorphous carbon (AC) hard mask) on the NFT layer 108, a first mask layer (e.g., a Ta layer) 112 on the hard mask layer 110, and a second mask layer (e.g., a Cr layer) 114 on the first mask layer 112. The hard mask layer 110, the first mask layer 112, and the second mask layer 114 are sub-layers of a composite hard mask for transferring the desired shape (e.g., pin and disc) to the NFT layer 108. While not shown in FIGS. 3A through 3O, the core layer 102 is formed on a cladding layer (e.g., a bottom cladding layer or a dielectric layer) in various embodiments.

A first photoresist 200 having a preselected shape is foamed on the Cr layer 114. In one embodiment, the first photoresist 200 has a circular cross-sectional area.

Referring to FIG. 3B, patterning (e.g., etching) is performed to remove portions of the Cr layer 114 not covered by the first photoresist 200 so that the shape of the first photoresist 200 is transferred to the patterned Cr layer 114. Referring to FIG. 3C, the first photoresist 200 has been removed, and a second photoresist 202 having a preselected shape is formed on a portion of the Ta layer 112 and a portion of the patterned Cr layer 114. In one embodiment, the second photoresist 202 has a rectangular shape corresponding to the pin of the NFT to be formed in the following steps.

Referring to FIG. 3D, patterning is performed to remove portions of the Ta layer 112 that are not protected by the second photoresist 202 and/or the patterned Cr layer 114. Therefore, the shape (e.g., disc and pin) of the NFT is transferred to the patterned Ta layer 112 using the second photoresist 202 and the patterned Cr layer 114 as a mask. Then, the photoresist 202 is removed. Referring to FIG. 3E, patterning is performed to remove portions of the hard mask layer 110 so that the shape of the NFT is transferred to the hard mask layer 110 using the patterned Cr layer 112 and/or the Cr layer 114 as a mask. After the hard mask layer 110 has been patterned, the patterned Cr layer 114 is removed.

Referring to FIG. 3F, patterning is performed to remove portions of the NFT layer 108 and the spacer layer 106 using the patterned hard mask 110 so that the shape of the patterned hard mask 110 is transferred to the NFT layer 108 to realize the desired NFT shape. Then, ion milling (e.g., Ar milling) or other suitable methods can be used to finalize the formation of the NFT. Here, the patterned hard mark 110 still remains on the finished NFT 108. Referring to FIG. 3G, a second spacer layer 116 (e.g., a layer of $Al_2O_3$) is deposited to cover the hard mask 110, the NFT 108, the spacer layer 106, and the cladding layer 104. The second spacer layer 116 has horizontal portions 116a and a vertical portion 116b. In one embodiment, the second spacer layer 116 is deposited by atomic layer deposition (ALD). However, the present invention is not limited thereto. Other suitable methods and materials can be used to form the second spacer layer 116 in various embodiments. A thickness of the second spacer layer 116 corresponds to the thickness of the stress buffer to be formed in the following steps. In one embodiment, the second spacer layer 116 has a thickness of about 10 nm.

Referring to FIG. 3H, vertical milling is performed to remove the horizontal portions 116a of the second spacer layer 116. The vertical portion 116b of the second spacer layer 116 is not significantly affected by the vertical milling and remains covering the side surfaces of the hard mask 110, the NFT 108, and the first spacer layer 106. Referring to FIG. 3I, a dielectric layer 118 is deposited (e.g., by a backfill method) to cover the hard mask 110, the second spacer layer 116, the NFT 108, the spacer layer 106, and the cladding layer 104. The top surface 118a of the formed dielectric layer 118 is higher than the top surface 108a of the NFT 108. In one embodiment, the dielectric layer 118 is a $SiO_2$ layer having a thickness of about 70 nm.

Referring to FIG. 3J, a top portion of the dielectric layer 118 has been removed, for example, by chemical mechanical polishing (CMP), to expose the hard mask 110. In addition, another hard mask 120 is patterned and has an opening 120a with a preselected shape to expose the NFT 108 therein. The opening 120a is sized to be larger than the combined size of the NFT 108 and the second spacer layer 116 by a preselected distance (d) so that the NFT 108 (still covered by the hard mask 110) and the second spacer layer 116 are exposed. Referring to FIG. 3K, the second spacer layer 116 is removed to expose an air gap 122 between the NFT 108 and the dielectric layer 118. In one embodiment, a photoresist developer (e.g., 0.26N TMAH) is used to remove the second spacer layer 116. Accordingly, the exposed air gap 122 has a width substantially equal to the thickness of the removed second spacer layer 116, and the air gap 122 surrounds the periphery of the NFT 108.

Referring to FIG. 3L, a third photoresist 124 is patterned to define an edge across the air gap 122. In one embodiment, the third photoresist 124 has a substantially straight edge (E) and covers a portion of the air gap 122. In one embodiment, the third photoresist 124 has a thickness of about 220 nm, and a distance (X) between the edge (E) of the third photoresist 124 and the joint point of the disc and pin of the NFT is about 3 sigma of disc overlay (e.g., 25 nm). Referring to FIG. 3M, the exposed portion of the air gap 122 not covered by the third photoresist 124 is cleaned, for example, using $O_2$ plasma. Then, a dielectric layer 126 is deposited so that the cleaned portion of the air gap 122 is filled or covered with the dielectric layer 126. In one embodiment, the dielectric layer 126 is formed by depositing a layer of $SiO_2$ by chemical vapor condensation deposition.

Referring to FIG. 3N, the dielectric layer 126 and the third photoresist 124 are removed to expose the hard masks 110 and 120. In one embodiment, side-mill assisted liftoff followed by CMP can be used to remove the third photoresist 124 and the dielectric layer 126 so that the hard masks 110 and 120 and the unfilled portion of the air gap 122 are exposed. The unfilled portion of the air gap 122 is protected by the third photoresist 124 so that the unfilled portion of the air gap 122 is not filled with the dielectric layer 126. Referring to FIG. 3O, the hard masks 110 and 120 are removed, and a dielectric layer 128 is deposited to seal the air gap 122 between the NFT 108 and the dielectric layer 118. The sealed air gap 122 provides an effective stress buffer bordering a portion of the periphery of the NFT 108. Because the air gap 122 has a high aspect ratio (e.g., 1:5), the dielectric layer 128 deposited on top of the air gap 122 will not substantially penetrate the air gap 122. According to the above described process in reference to FIGS. 3A through 3O, a stress buffer having an annular shape can be formed to surround a portion of the periphery of the NFT so that a thermal expansion stress on the NFT can be reduced during the thermal expansion of the NFT. Therefore, the pin of the NFT can be prevented from protruding to the ABS surface, and the lifespan of an EAMR head incorporating the stress buffer for the NFT may be extended.

Figure 4:
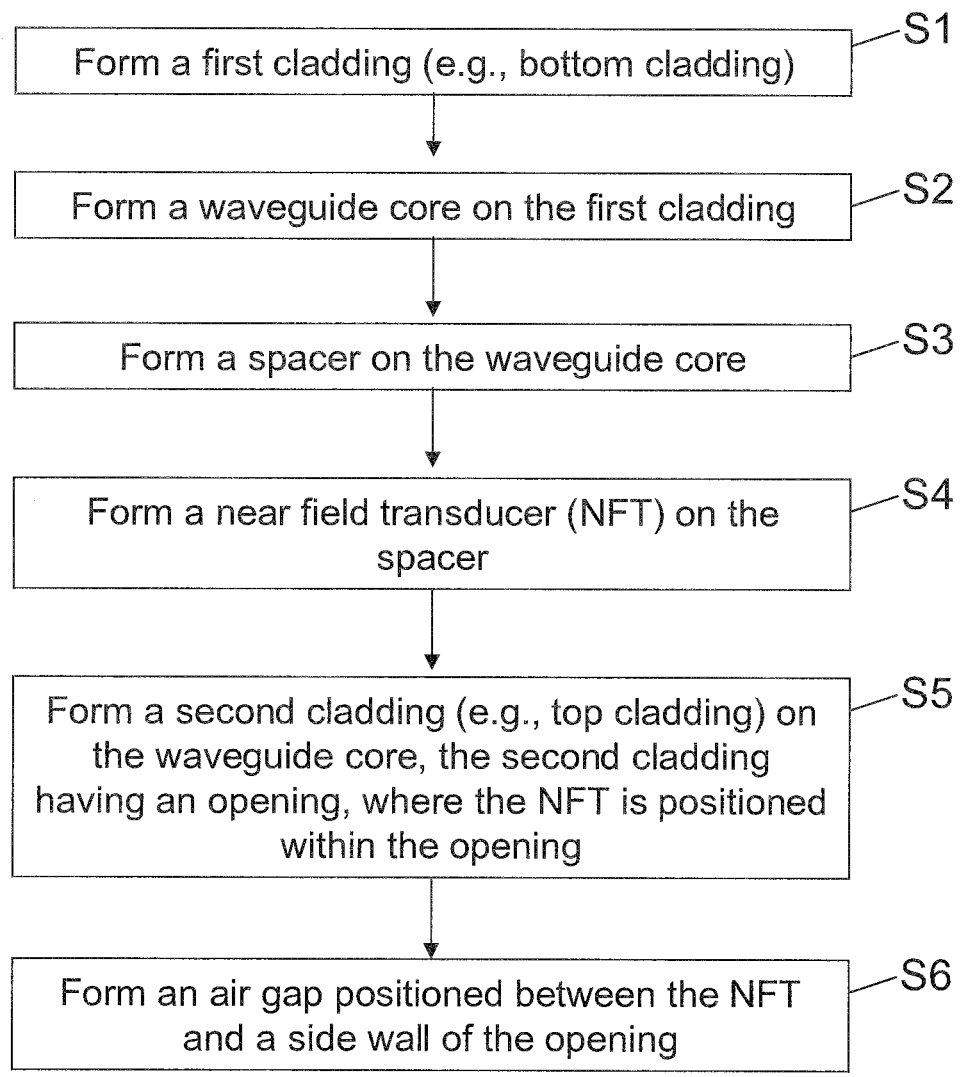
FIG. 4 is a flowchart illustrating a method of fabricating an NFT with a stress buffer for an EAMR head according to an embodiment of the present invention.

FIG. 4 is a flowchart illustrating a method of fabricating an NFT with a stress buffer for an EAMR head according to an embodiment of the present invention. Referring to FIG. 4, the method includes a number of processes. In step S1, a first cladding (e.g., a bottom cladding) is formed. In step S2, a waveguide core is formed on the first cladding. In step S3, a spacer is formed on the waveguide core. The spacer is positioned between the NFT and the waveguide core to protect the waveguide core when the NFT is processed to its desired shape. In step S4, a near field transducer (NFT) is formed on the spacer. In step S5, a second cladding (e.g., a top cladding) is formed on the waveguide core. The second cladding has an opening, and the NFT is positioned within the opening. In step S6, an air gap is formed positioned between the NFT and a side wall of the opening.

In the above described embodiments, the process or method can perform the sequence of actions in a different order. In another embodiment, the process or method can skip one or more of the actions. In other embodiments, one or more of the actions are performed simultaneously or concurrently. In some embodiments, additional actions can be performed.

While the present invention has been particularly shown and described with reference to various embodiments, it will be understood by those of ordinary skill in the art that various changes in form and details may be made therein without departing from the spirit and scope of the present invention as defined by the following claims and their equivalents.

What is claimed is:

1. An energy assisted magnetic recording (EAMR) head comprising:
    a waveguide;
    a near-field transducer (NFT) configured to receive optical energy from the waveguide;
    a cladding of the waveguide having an opening, wherein the NFT is positioned within the opening; and
    an air gap positioned between the NFT and a side wall of the opening.

2. The EAMR head of claim 1, wherein the cladding comprises a dielectric layer.

3. The EAMR head of claim 1, wherein the NFT comprises a body and a pin extending from a first portion of the body, and the air gap is located at a second portion, opposite the first portion, of the body.

4. The EAMR head of claim 1, wherein the air gap extends around a portion of a periphery of the NFT.

5. The EAMR head of claim 1, wherein the air gap has a shape conforming to a portion of a periphery of the NFT.

6. The EAMR head of claim 1, wherein the air gap has a width corresponding to a dimension of the NFT.

7. The EAMR head of claim 6, wherein a ratio of the width of the air gap to a thickness of the NFT is about one-fifth.

8. The EAMR head of claim 6, wherein the width of the air gap is about 10 nm.

9. The EAMR head of claim 1, wherein the air gap has a preselected width sufficient to reduce a stress on the NFT during a thermal expansion thereof by a preselected amount.

10. The EAMR head of claim 1, wherein the air gap is located at a portion of the NFT facing away from an air bearing surface.

11. The EAMR head of claim 1, wherein the air gap comprises a plurality of air gaps respectively bordering different portions of a periphery of the NFT.

12. The EAMR head of claim 11, wherein the plurality of air gaps respectively correspond in position to preselected thermal expansion portions of the NFT.

13. The EAMR head of claim 11, wherein the plurality of air gaps comprise:
    a first air gap located at a first portion of the NFT facing away from an air bearing surface (ABS); and
    a second air gap and a third air gap respectively located at opposite portions of the NFT along a line that is substantially parallel to the ABS and substantially bisects a portion of the NFT.

14. The EAMR head of claim 1, wherein the waveguide comprises a waveguide core and the cladding comprising a first cladding and a second cladding, the waveguide core being positioned between the first cladding and the second cladding.

15. A method of fabricating an energy assisted magnetic recording (EAMR) head, the method comprising:
    forming a first cladding;
    forming a waveguide core on the first cladding;
    forming a spacer on the waveguide core;
    forming a near field transducer (NFT) on the spacer;
    forming a second cladding on the waveguide core, the second cladding having an opening, wherein the NFT is positioned within the opening; and
    forming an air gap positioned between the NFT and a side wall of the opening.

16. The method of claim 15, wherein the air gap extends around a portion of a periphery of the NFT.

17. The method of claim 15, wherein the air gap has a shape conforming to a portion of a periphery of the NFT.

18. The method of claim 15, wherein the air gap has a width corresponding to a dimension of the NFT.

19. The method of claim 18, wherein a ratio of the width of the air gap to a thickness of the NFT is about one-fifth.

20. The method of claim 18, wherein the width of the air gap is about 10 nm.

21. The method of claim 15, wherein the air gap has a preselected width to reduce a stress on the NFT during a thermal expansion thereof by a preselected amount.

22. The method of claim 15, wherein the air gap is located at a portion of the NFT facing away from an air bearing surface.

23. The method of claim 15, wherein the forming the air gap comprises forming a plurality of air gaps respectively bordering different portions of a periphery of the NFT.

24. The method of claim 23, wherein the NFT has multiple poles, and the plurality of air gaps correspond in position to the multiple poles, respectively.

25. The method of claim 23, wherein the plurality of air gaps comprise:
    a first air gap located at a first portion of the NFT facing away from an air bearing surface (ABS); and
    a second air gap and a third air gap respectively located at opposite portions of the NFT along a line that is substantially parallel to the ABS and substantially bisects a portion of the NFT.

26. The method of claim 15, wherein the forming the air gap comprises:
    forming a spacer layer on the NFT, the spacer layer having a thickness substantially equal to a width of the air gap;
    forming a first dielectric layer, the spacer layer positioned between the first dielectric layer and the NFT, and opposite sides of the spacer layer respectively abutting the dielectric layer and the NFT; and
    etching away the spacer layer to expose the air gap.

27. The method of claim 26, wherein the spacer layer comprises $Al_2O_3$.

28. The method of claim 26, wherein the forming the spacer layer comprises depositing the spacer layer by atomic layer deposition.

29. The method of claim 26, further comprising forming a photoresist on a portion of the air gap.

30. The method of claim 29, further comprising:
    forming a second dielectric layer on another portion of the air gap not covered by the photoresist; and
    removing the photoresist.

31. The method of claim 15, further comprising adjusting a width of the air gap during a process of fabricating another one of the EAMR head.

* * * * *